Aug. 26, 1947.  H. M. JOHNSTON  2,426,354
DISC TILLER
Filed Feb. 19, 1944  3 Sheets-Sheet 2

INVENTOR.
HOWARD M. JOHNSTON
BY
ATTORNEY

Aug. 26, 1947.        H. M. JOHNSTON        2,426,354
DISC TILLER
Filed Feb. 19, 1944        3 Sheets-Sheet 3

INVENTOR.
HOWARD M. JOHNSTON
BY
ATTORNEY

Patented Aug. 26, 1947

2,426,354

UNITED STATES PATENT OFFICE 2,426,354

DISC TILLER

Howard M. Johnston, Toronto, Ontario, Canada, assignor to Massey-Harris Co. Ltd., Toronto, Ontario, Canada, a corporation of Canada Application February 19, 1944, Serial No. 523,131

4 Claims. (Cl. 97—53)

1

The present invention relates to one-way disc tillers particularly adapted to be tractor pulled and having a complete frame and a disc gang comprising a carrying tube with spaced bearings thereon for the disc shaft, the tube being rotatably mounted on and surrounding the main frame member.

An object of the present invention is to provide a wheel carried main frame with means for manually adjusting the height of the frame and a power lift adapted to turn the rotatably mounted gang tube for raising and lowering the discs independent of the frame.

It is also an object of my invention to adjust the depth of the discs by turning the gang tube manually so as to provide convenient close depth regulating means which extend within easy reach of the operator of the tractor.

A further object of my invention is to reduce the power required to raise and lower the discs to a minimum and limit the number of joints between the power lift and the manual adjusting means and the discs whereby depth adjustment is definite and precise regardless of soil and trash conditions, whereas in conventional one-way disc harrows there are so many joints and flexing parts in the raising and lowering mechanism and depth regulating means that the discs are not definitely held at a uniform depth under all conditions.

An important object of my invention is to provide a design whereby the discs may be set for very shallow cultivating and will remain at uniform depth under all soil conditions; that is in a field where the soil has varying spots of hardness or trash.

Another object of my invention is to provide means whereby the disc carrying tube resists torsional strains and is braced or anchored by the main frame member it surrounds and whereby a draft hitch may be secured to the tube intermediate its ends, which is equivalent to having this connection on the frame, thus to prevent the disc tube from bending upwardly or rearwardly at its center by the action of the soil on the discs.

To these and other useful ends my invention consists of parts and combinations of parts or their equivalents and mode of operation as hereinafter described and claimed and shown in the accompanying drawings in which:

Figure 1:
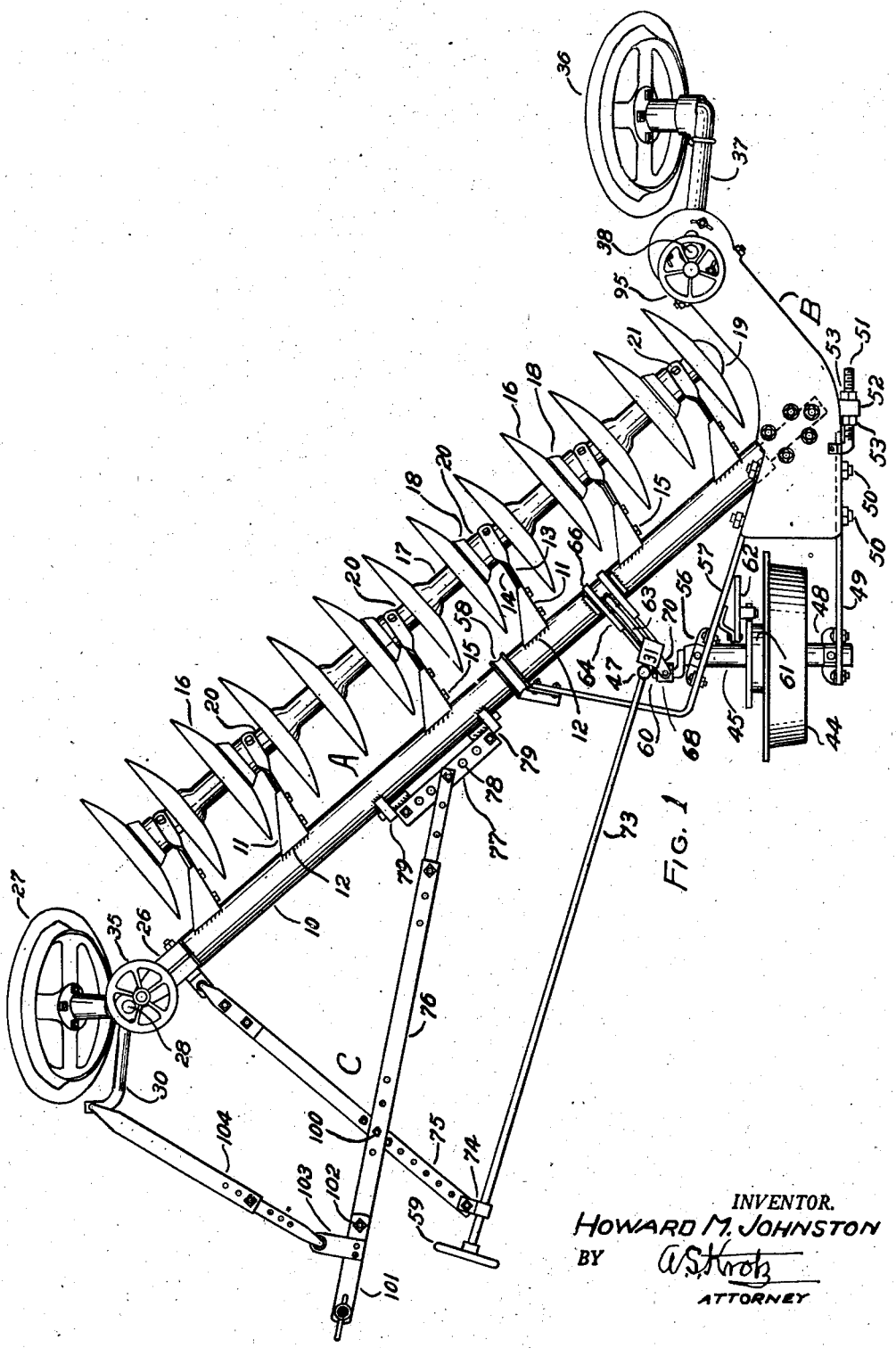
Figure 1 is a top view of the preferred form of my invention.

As thus illustrated the disc gang in its entirety is designated by reference character A. The left hand frame member is designated in its entirety by reference character B. The hitch connections in their entirety are designated by reference character C. Member A comprises a relatively large tube 10 having spaced brackets 11 which preferably partly surround the tube and are welded to the tube at their tops and bottoms as at 12 and having rearwardly extending steel plates 13 and 14 which lie together between the flanges of member 11 and are secured to the brackets by means of bolts 15.

The remainder of the disc gang consists of a number of spaced discs 16 being held in spaced relation by sleeves 17 and bearing sleeves 18. The disc sleeves and bearing sleeves are mounted on the usual square shaft (not shown), one end being provided with a large head 19 and the other end with a nut (not shown), whereby the assembly may be made taut as is the custom in disc gangs.

Figure 7:
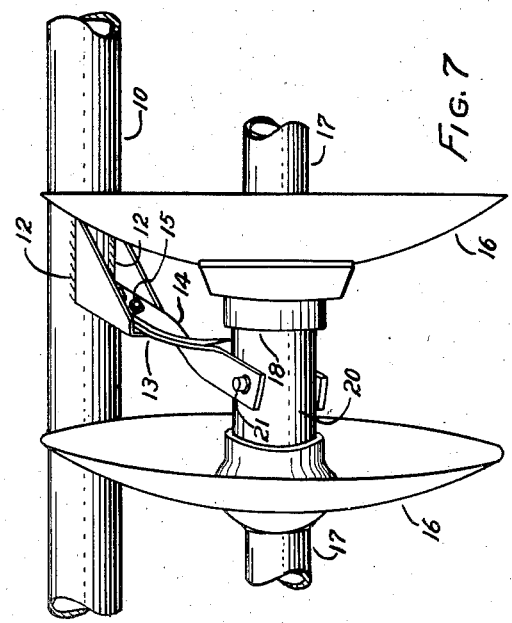
Figure 7 is a rear view of the fastening between the disc gang bearings and the disc gang tube.
Figure 6:
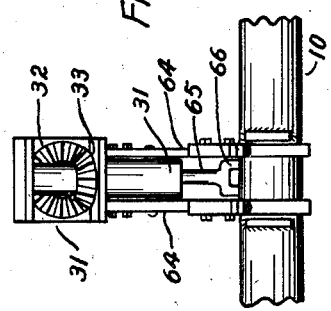
Figures 5 and 6 are enlarged views of the connection between the power lifting device, the manual adjusting means and the disc gang.

I provide bearings 20 to which the rear ends of members 13 and 14 are suitably secured. In Figure 7 members 13 and 14 are shown as having their rear ends twisted and spaced apart so as to straddle bearings 20 which are provided with projections 21 which extend through suitable openings in the ends of members 13 and 14.

Member 10 is rotatably mounted on and surrounds a main frame member 25 the ends of which protrude. On the front end of member 25 I mount a bracket 26 which carries a ground wheel 27. This ground wheel is rotatably mounted on the axle (not shown), having a vertical member 28 which is rotatably mounted in bracket 26, the axle having an arm 30 secured thereto for a purpose which will hereinafter appear.

Figure 2:
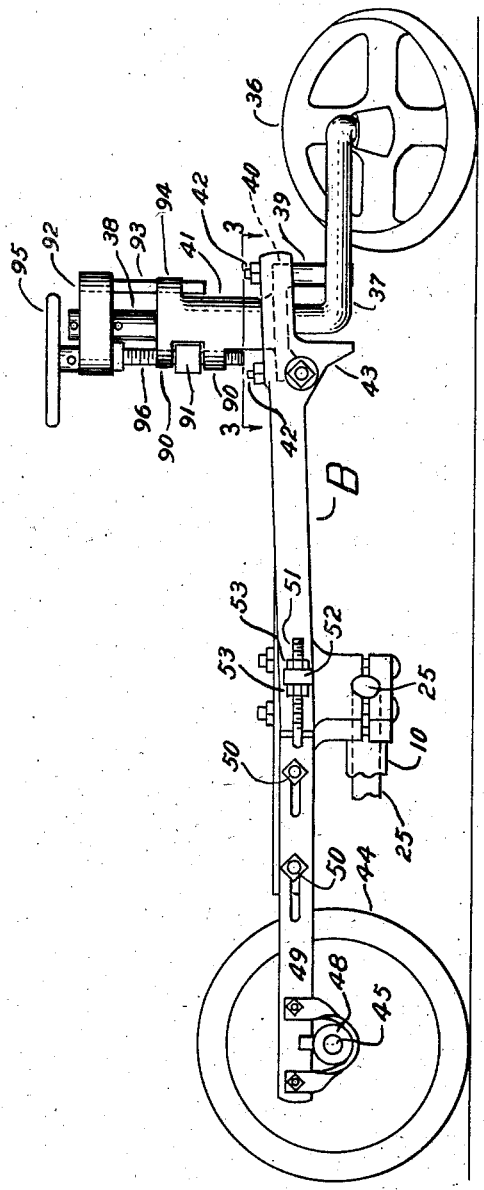
Figure 2 is an elevational end view of the supplemental frame, illustrating fractionally the fastening of the main frame member to the supplemental frame.
Figure 4:
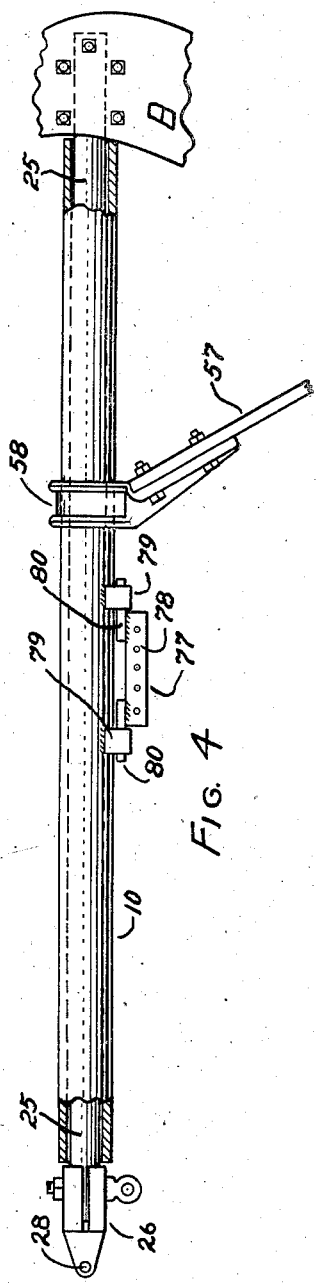
Figure 4 is a fractional top view of the disc gang tube illustrating fractions of the end frame brackets and other parts of the assembly as shown in Figures 1 and 2.

I provide a hand operated wheel 35 with connections to bracket 26 and to member 28 having means so the front end of the frame may be raised and lowered manually, the details being similar to those shown in Figure 2. On the rear end of the main frame member 25 I secure the supplemental frame B about in the position and as shown. I provide a rear carrying wheel 36 which is positioned at a vertical angle as shown so as to take some of the left hand thrust of the discs. Wheel 27 is also positioned at an angle as shown for this same purpose. Wheel 36 is rotatably mounted on an axle 37 having at its front end a vertical extension 38 which is rotatably mounted in bracket 40 and I provide a vertical extension 41 to this bracket.

I provide a stop 39 on bracket 40 which is adapted to determine the maximum swing to the right of wheel 36 while the device is traveling forward. Bracket 40 is rotatably mounted in the rear end of member B and held in adjusted position by bolts 42. A stop 43 is provided on member B so as to limit the left hand swing of wheel 36.

I mount another carrying wheel 44 on frame member B as follows: member 44 is rotatably mounted on a shaft 45 the outer end being carried by a bearing 48. The bearing is secured to the forward end of a bar 49. Bar 49 is secured to member B by means of bolts 50—50 and having slots providing means for moving the bar forwardly and rearwardly. This moving is accomplished by means of a bolt 51, the front end being extended through an opening in the rear end of the bar the other end extending through a lug 52 which is secured to member B and having nuts 53—53 thus providing positive means for adjusting and holding the bar in the desired position. The other end of shaft 45 is rotatably mounted in a bearing 56 which is secured to a supplemental frame brace 57. One end of this brace is secured to member B as shown, the other end being rotatably anchored to tube 10 as at 58 (see Figure 1). The sleeve of bearing 56 is obviously provided with means which will permit the forward and rearward movement of bearing 48 as already specified.

It will be seen that I have provided means for adjusting the angle of the wheels 36 and 44. The inner end of shaft 45 is provided with a crank 60. Wheel 44 is provided with a half turn clutch 61, one part of which is secured to the wheel and the other to the shaft and having a clutch operating lever 62 with a rope (not shown), which extends to the tractor whereby the shaft 45 may be caused to make a half turn at each pull of the rope.

I provide an arm 63 which is rigidly secured to tube 10 and two arms 64—64 which are rotatably mounted on tube 10. A threaded bar 65 having a fork 66 is pivoted to the free end of member 63 as shown. Arms 64 have at their free ends a trunnion 67 which is operatively connected to crank 60 as follows: a block 68 is rotatably mounted on crank 60. A threaded bolt 69 having a fork 70 is pivotally mounted on block 68 as shown and being threaded into a forked block 71 at its upper end. Member 71 is pivoted to a block 72, the block being rotatably mounted on trunnion 67 as shown.

I provide a bracket 31 which is pivoted to arms 64 as illustrated, the upper end being U-shaped to thereby provide room for pinions 32 and 33. Bar 65 is threaded in pinion 32 and member 31 is provided with a projection 34 through which the shaft of pinion 33 extends, the shaft having at its forward end a universal joint 47.

Thus it will be seen that crank 60 will operate to oscillate tube 10 on frame member 25 because of the connection between bolt 65, bracket 31 and pinion 32 and that the relative position of arm 63 to members 64 may be changed by turning pinion 33.

In practice I provide a U-shaped cover member (not shown) which fits over the upper end of member 31 so as to form a grease tight enclosure for the pinions. Thus it will be seen that the disc gang may be raised and lowered by means of the half turn clutch associated with crank 60 and that the relative position of the disc gang to that of crank 60 may be changed by turning universal joint 47. A shaft 73 is connected to universal joint 47 having at its forward end a hand wheel 59 positioned within reach of the tractor operator for convenient adjustment of the depth plowed by the discs. Adjacent its front end, shaft 73 is provided with a bearing 74 which is secured to a hitch bar 75.

Hitch bar 75 is horizontally pivoted at its rear end to bracket 26. Another hitch bar 76 is vertically pivoted to a bar 77 having a number of spaced apertures 78. Bar 77 is horizontally pivoted at its ends to tube 10 by means of ears 79—79 which are rigidly secured to the tube and by stub shafts as illustrated, which extend freely through apertures in these members, the inner ends being welded to bar 77 as illustrated.

Hitch bar 76 is provided with an extension bar which is adjustably secured to member 77 as illustrated. Bars 75 and 76 are adjustably secured together as at 100. Thus it will be seen that the front end of 76 may be moved to the right or left on bar 75 and that the rear end may be moved to the right or left on member 77. On the front end of bar 76 I vertically pivot at its rear end, a link 101 as at 102 having means at its forward end to be connected to the draw bar of a tractor. A short bar 103 is rigidly secured to link 101 the free end of which is connected to member 39 by means of a bar 104. This bar 104 is adjustable as to length as illustrated. Thus the position of the attachment to the draw bar of the tractor and the length of bar 104 will determine the direction of travel of wheel 27, and the adjustment of bars 75 and 76 will determine the angle of frame member 25 relative to the direction of travel.

Referring again to Figure 2; member 41 it will be noted has spaced ears 90—90 between which is positioned a threaded nut 91, the nut being held from turning. A bracket 92 is rotatably secured to member 38 and being held from turning by means of a bolt 93 which slidably extends through an ear 94. A hand wheel 95 is provided with a bolt 96 which threadably engages nut 91. Thus it will be seen that by turning wheel 95 the rear end of frame B may be raised or lowered. The connection of hand wheel 35 to member 28 and bracket 26 is preferably similar to the connections between members 95 and 41, thus providing means for raising or lowering the front end of frame member 25.

Figure 5:
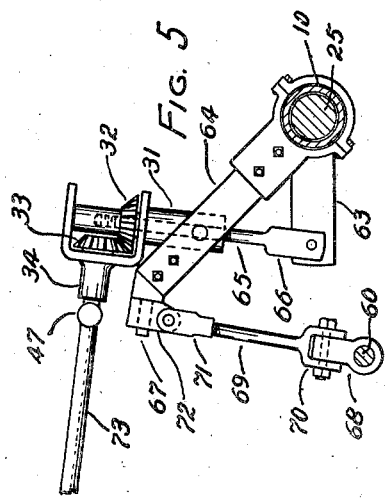
Figure 3:
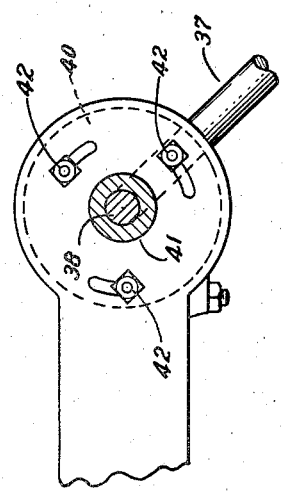
Figure 3 is an enlarged top view of the rear end of the supplemental frame shown in Figure 2 and taken on line 3—3 of Figure 2 and illustrating fractionally the rear carrying wheel axle.

It will be seen that very little power will be required to raise or lower the disc gang; that the major part of the weight of the device rides on the wheels at all times and that this weight will act to hold the discs to a predetermined depth; that the only lost motion between the frame of the device and the discs is in the joints of the parts clearly illustrated in Figure 5; that this lost motion can only represent a vertical movement of the disc gang of less than ¼ inch; that the connections between tube 10 and crank 60 are direct and strong so that there will be practically no torsional or bending strains to affect the position of the discs.

Attention is called to the fact that the strength to resist bending of frame member 25 and tube 10 is very great and that tube 10 will definitely resist torsional strains; and in view of the connection of the rear end of hitch member 76, it also will act to prevent the bending of the frame and tube members while the gangs are operating. It will be understood that for the smaller sizes member 76 may be connected direct to supplemental frame B or supplemental frame bars 57.

It will also be understood that the discs may be spaced further apart and rotatably mounted direct to the tube instead of being mounted so as to form a disc gang. The device then is more similar in its operation to a disc plow.

Having thus shown and described my invention, I claim:

1. An earth tiller of the character described comprising, a shaft forming a main frame member and being positioned at an angle to the direction of travel, carrying wheels mounted on the front and rear ends of said main frame member, an earth working member mounted on said main frame member, comprising a tube rotatably surrounding said main frame member for substantially the length thereof, spaced earth engaging discs rotatably secured to and positioned a short distance in rear of said tube, manually controlled means associated with said main frame and tube adapted to determine the vertical position of said discs by turning said tube on said main frame member, draft means connected to the front end of the main frame member and to the front edge of said tube intermediate the ends of the tube, their front ends being adjustably connected together whereby the angle of said main frame relative to the direction of travel may be manually determined.

2. A device as recited in claim 1 including, said draft means comprising two bars, one horizontally hingedly connected at its rear end to the front end of said main frame member and the rear end of the other draft bar being horizontally hingedly connected to said tube, a draft link having at its rear end a vertically hinged connection to the front end of one of said draft bars, its front end being adapted to be connected to the draw-bar of a tractor, said front wheel being mounted on a vertically pivoted axle, an operating connection between said draft link and said front wheel axle whereby the position of the front wheel is determined by the position of said draft link.

3. An earth tiller of the character described comprising, a shaft forming a main frame member and being positioned at an angle to the direction of travel and having carrying wheels secured to the front and rear ends thereof, an earth working gang mounted on said main frame member, comprising a tube rotatably surrounding said main frame member for substantially the length thereof, spaced earth engaging means secured to and positioned a short distance in rear of said tube, manually operated means adapted to determine the vertical position of the earth working means by turning said tube on said main frame member, draft means hingedly connected in spaced relation to the front end of said main frame member and to said tube intermediate its ends.

4. A disc tiller of the character described comprising, a shaft forming a main frame member being positioned at an angle to the direction of travel and having a carrying and guiding wheel mounted on the forward end thereof, another frame secured to the rear end of said main frame and being positioned generally in the direction of travel, carrying wheels mounted on the front and rear ends of said other frame, a gang frame mounted on said main frame member, comprising a tube being rotatably mounted on and surrounding the main frame member for substantially the length thereof and having secured thereto a number of spaced rearwardly extending arms, a disc gang rotatably mounted on the rear ends of said arms, a hitch bar horizontally hingedly connected to the front end of said main frame, another hitch bar horizontally hingedly connected to said tube a distance from the front end thereof, said hitch bars converging forwardly and being adjustably secured together, a draft link vertically pivoted to the front end of one of said hitch bars and being adapted at its front end to be attached to a tractor and having an operating connection to said front wheel whereby the direction of the front wheel is determined by said draft link, a half turn power lift clutch associated with the front wheel on said other frame and having a manually controlled connection to said tube and means whereby the discs may be raised and lowered by said power lift and said manually controlled means independently.

HOWARD M. JOHNSTON.

REFERENCES CITED

The following references are of record in the file of this patent:

UNITED STATES PATENTS

| Number | Name | Date |
| --- | --- | --- |
| 816,518 | Wiard | Mar. 27, 1906 |
| 1,301,628 | Weaver | Apr. 22, 1919 |
| 1,395,447 | Mondriuk | Nov. 1, 1921 |
| 1,944,674 | Silver | Jan. 23, 1934 |
| 2,017,872 | Strandlund | Oct. 22, 1935 |
| 2,113,556 | De Rocher | Apr. 5, 1938 |
| 2,184,428 | Lindgren | Dec. 26, 1939 |
| 2,239,596 | Doane | Apr. 22, 1941 |